United States Patent [19]

Felker et al.

[11] Patent Number: 4,890,278
[45] Date of Patent: Dec. 26, 1989

[54] APPARATUS AND METHOD FOR CALIBRATED MONITORING OF OUTPUT VOLTAGE LEVELS OF LOCAL AREA NETWORK COMMUNICATION DEVICES

[75] Inventors: Michael A. Felker, Rio Rancho; Angelo N. Viverito; John W. Gilstrap, both of Albuquerque; Jesus J. Martos, Tijeras; Ruben Trujillo, Albuquerque, all of N. Mex.; Chang J. Wang, Nashua, N.H.

[73] Assignee: Digital Equipment Corporation, Maynard, Mass.

[21] Appl. No.: 368,995

[22] Filed: Jun. 16, 1989

Related U.S. Application Data

[63] Continuation of Ser. No. 123,891, Nov. 23, 1987, abandoned, which is a continuation-in-part of Ser. No. 76,724, Jul. 23, 1987, Pat. No. 4,799,211.

[51] Int. Cl.⁴ .............................................. H04J 1/16
[52] U.S. Cl. .................................... 370/17; 178/2 R; 364/571.05
[58] Field of Search ............... 370/13, 17, 85; 379/24, 379/30; 178/2 R; 340/825.5; 375/3.1, 3.6; 364/571.01, 571.02, 571.04, 571.05, 571.06

[56] References Cited

U.S. PATENT DOCUMENTS

4,669,052  5/1987  Bianco ................................. 364/571
4,712,106 12/1987  McNally .............................. 364/571

Primary Examiner—Joseph A. Orsino
Assistant Examiner—Frank M. Scutch, III
Attorney, Agent, or Firm—William W. Holloway; T. Carter Pledger

[57] ABSTRACT

Apparatus and method are disclosed for providing a calibrated measurement of signals applied to a local area network cable segment. A remote segment monitor unit has the signal sampling circuit coupled to a signal generating unit. The signal generating unit is controlled by a network system member (node) and applies a series of known signal levels to the signal sampling circuit of the remote segment monitor unit. The known signal levels from the signal generating unit and the signal levels measured by the remote segment monitor as a result of the known signal levels are compared and an appropriate scale factor entered in the processing circuit of the remote segment monitor. Using the calibrated remote segment monitor, the location of network nodes can be identified from the signal levels measured by the remote segment monitor. From the signals transmitted by cable segment, signal levels of transaction signals applied to the cable segment by the system nodes can be determined and marginal conditions can be identified prior to an actual failure of a system node.

19 Claims, 5 Drawing Sheets

APPARATUS AND METHOD FOR CALIBRATED MONITORING OF OUTPUT VOLTAGE LEVELS OF LOCAL AREA NETWORK COMMUNICATION DEVICES

This is a continuation of co-pending application Ser. No. 123,891 filed on Nov. 23, 1987, now abandoned, which is a continuation-in-part of 076,724, Jul. 23, 1987, now U.S. Pat. No. 4,799,211.

RELATED APPLICATIONS

This application is related to the following U.S Pat. Applications:

APPARATUS AND METHOD FOR STORING PERFORMANCE PARAMETERS OF LOCAL AREA NETWORK SYSTEM MEMBERS, invented by Michael Felker and Angelo Viverito, having Ser. No. 07/076,724, filed on July 23, 1987 and assigned to the assignee of the present U.S. patent application.

APPARATUS AND METHOD FOR DETERMINING NETWORK COMPONENT LOCATIONS ON A LOCAL AREA NETWORK SYSTEM CABLE SEGMENT, invented by Michael A. Felker, Chang J. Wang, Angelo N. Viverito, John W. Gilstrap and Jesus J. Martos, having Ser. No. 07/123,890, filed on Nov. 23, 1987 and assigned to the assignee of the present U.S. patent application.

BACKGROUND OF THE INVENTION

1. Field of the Invention

This invention relates generally to local area networks (LANs) and more particularly to apparatus and to a method for determining the location of a network node or component from the interaction of the network node or component with the local area network.

2. Description of the Related Art

Figure 1:
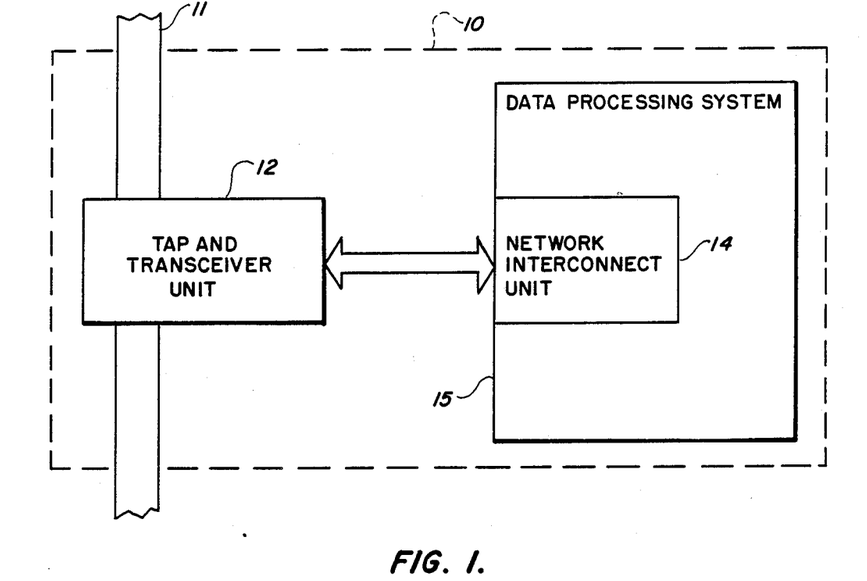
FIG. 1 is a block diagram of a local area network system member coupled to the cable segment.

For certain local area networks, such as networks using the Carrier Sense Multiple Access/Collision Detect (CSMA/CD) architecture, as defined by the IEEE 802.3, a multiplicity of devices can be coupled to a (cable) segment of the local area network. For example, a segment can consist of a coaxial cable segment 500 meters in length. A local area network can include a plurality of cable segments, each cable segment coupled by a repeater unit (to compensate for losses experienced by signal propagation along the cable) to other cable segments and having up to 1024 system members coupled thereto. The system members are coupled to the coaxial cable by means of a device typically referred to as a tap. The tap is a unit that clamps onto the coaxial cable, pushes aside the braided grounding wire, and forces a small pin into the central conducting element to detect signals transmitted on the central conducting element. Referring now to FIG. 1, the typical configuration of a device coupled to the cable segment is shown. The tap and transceiver unit 12 are coupled to the coaxial cable segment 11. The tap portion physically couples to cable segment 11, while the transceiver portion encodes signals that are going to be applied to the cable segment 11 in the specified local area network format and decodes signals received from the cable segment 11. The network interconnect unit 14 is coupled to the tap and transceiver unit 12 and provides the data link protocols specific to the local area network. The network interconnect unit 14 typically provides power for the tap and transceiver unit 12 through the same conducting leads that carry the signals. The network interconnect unit 14 is typically contained within a data processing system 15, the data processing system typically referred to as a network node.

In the related U.S. patent application 07/076,724, a technique is disclosed for determining voltage levels of signals on the cable segment of the local area network. Because no technique has been available for calibrating the measured voltage levels, performance characteristics were inferred from comparing the measured signals as a function of time. However, the more reliable technique for determining operating characteristics is to determine the actual value of the network signals. It is the signal values or levels themselves that determine when the network activity is not within specifications.

A need has been felt for a technique to measure the actual voltage level of signals applied to the network rather than rely on time dependent changes in voltage levels to infer a deterioration of network operating conditions.

FEATURES OF THE INVENTION

It is an object of the present invention to provide an improved local area network.

It is a feature of the present invention to provide a technique for measuring voltage levels of signals applied to the local area network.

It is another feature of the present invention to provide a technique for calibration of a remote segment monitor unit so that voltage levels measured by the remote segment monitor unit reflect the actual signal voltage levels of signal levels applied to the cable segment by the system nodes.

It is yet another feature of the present invention to determine when the nodes of a local area network are operating within specification by measuring the voltage levels of signals on the network.

SUMMARY OF THE INVENTION

The aforementioned and other features are attained, according to the present invention, by coupling a signal sampling circuit of a remote segment monitor unit to a signal generating unit. After applying a plurality of known voltage levels from the signal generating unit to the signal sampling circuit, the resulting digitized stored signal is compared with the known signal voltage levels. In the preferred embodiment, a least squares algorithm is used to determine an off-set factor and a scaling factor relating measured voltage levels to the known applied voltage levels. Using these factors, the remote segment monitor unit can be calibrated and the actual voltage levels of transaction signals on the local area network can be determined from the transaction signal levels measured by the remote segment monitor. The ability to measure the actual signal levels on the cable segment permits important parameters of the system nodes to be determined.

These and other features of the present invention will be understood upon reading of the following description along with the drawings.

DESCRIPTION OF THE PREFERRED EMBODIMENT

1. Detailed Description of the Figures

FIG. 1 has been described with reference to the related art.

Figure 2:
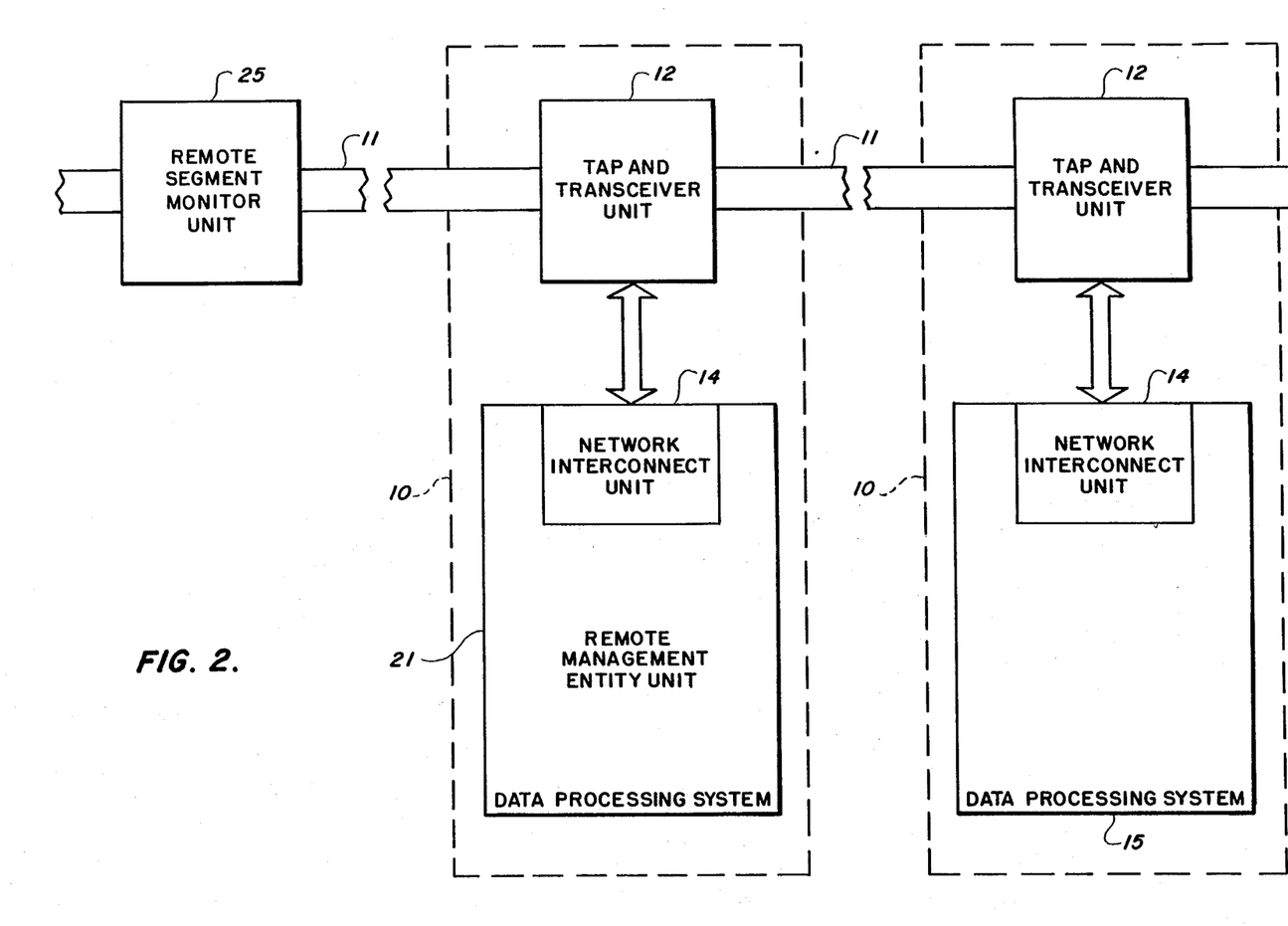
FIG. 2 is a block diagram of the principal components of the signal analyzing network of the present invention.

FIG. 2 illustrates the relationship of the components of the local area network signal analyzing network of the present invention. A plurality of system members 10 (each system member 10 typically including a tap unit and transceiver unit 12, a network interconnect unit 14 and a data processing system 15) are coupled to cable segment 11, the cable segment 11 providing the communication path between the system members 10. System members are sometimes referred to as system nodes or network nodes. One system member 20, has a data processing system referred to as a remote management entity unit 21. Finally, the cable segment 11 of the local area network can have a remote segment monitor unit 25 coupled thereto. The remote segment monitor unit 25 stores data related to transaction signals occurring over the cable segment 11. This stored data is periodically transferred to the remote management entity unit 21, wherein the data is analyzed and properties related to the transaction sources (or intervening apparatus such as cable segment repeaters) can be analyzed.

Figure 3:
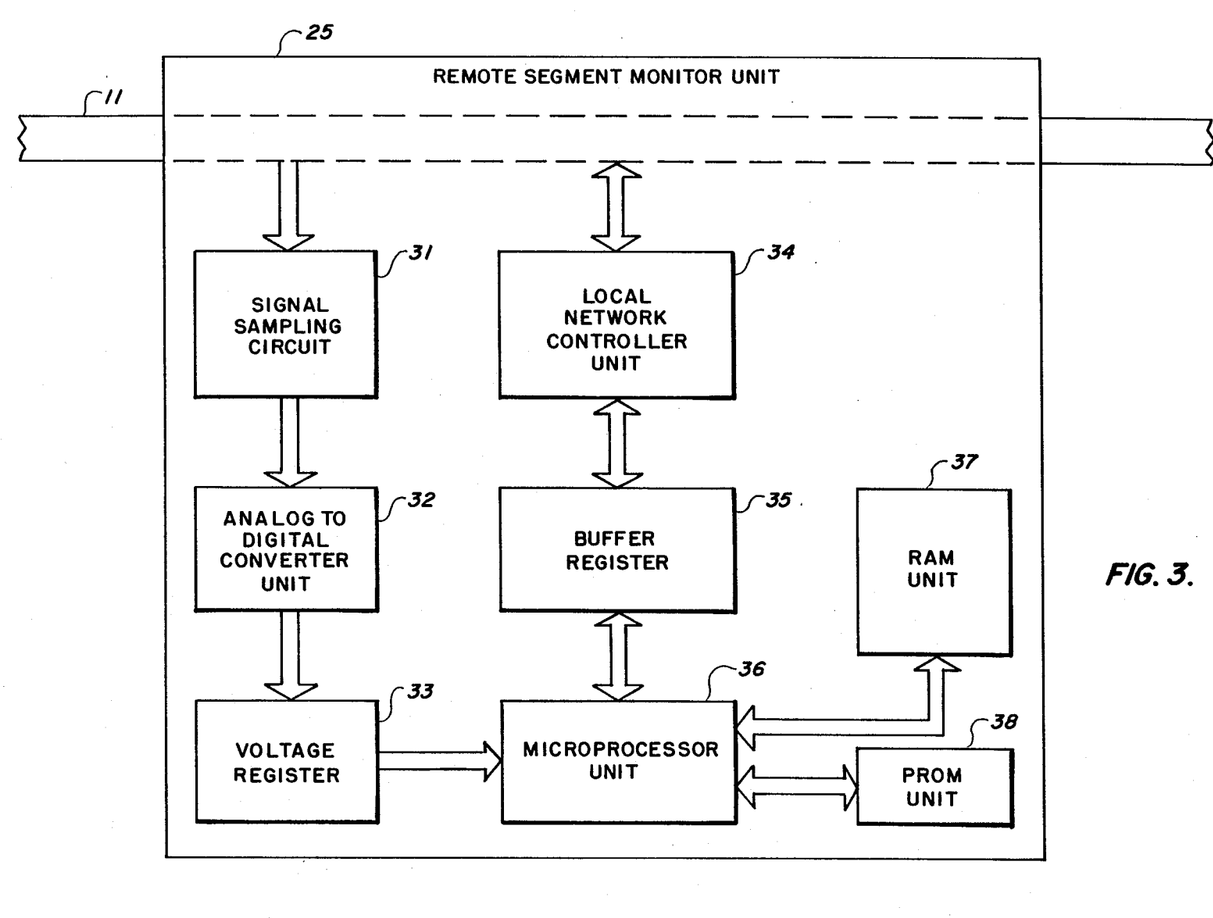
FIG. 3 is a block diagram remote segment monitor unit according to the present invention.

Referring next to FIG. 3, a block diagram of the components of the remote segment monitor unit 25, according to the present invention, is shown. A signal sampling circuit 31 receives signals from the cable segment 11 and applies the sampled signals to the analog to digital converter unit 32. The digitalized signals from the analog to digital converter unit 32 are applied to and stored (temporarily) in voltage register 33. The local area network controller unit 34 receives signals from and applies signals to the cable segment 11. The buffer register unit 35 applies signals to and receives signals from the local (area) network controller unit 34. The buffer register unit 35 also transfers signals to and receives signals from the microprocessor unit 36. The microprocessor unit 36 can receive signals from the voltage register 33, receives signals from the PROM (programmable read only memory) unit 37 and can exchange signals with the RAM (random access memory) unit 37.

Figure 4:
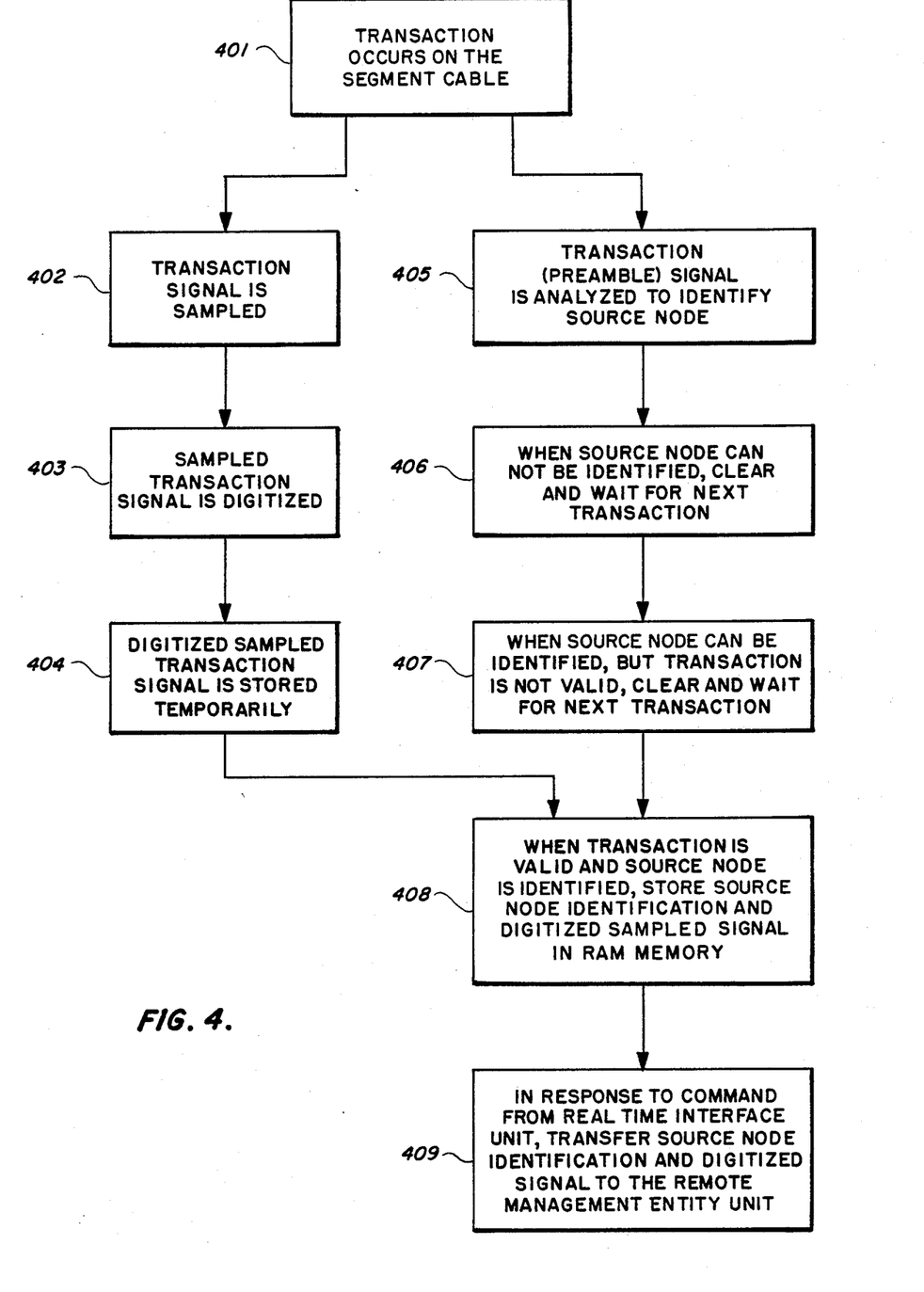
FIG. 4 is a flow diagram illustrating the operation of the remote segment monitor unit.

Referring next to FIG. 4, a flow diagram illustrating the operation of the remote segment monitor unit is shown. In step 401, a transaction occurs on the cable segment. As a result of the presence of a transaction signal on the segment cable, the transaction signal voltage level is sampled in step 402. The sampled transaction signal is digitized in step 403, and in step 404, the digitized, sampled transaction signal is temporarily stored (i.e., in voltage register 33). Simultaneously, the preamble or header of the transaction is being decoded and the node originating the transaction is identified in step 405. In step 406, when the source node 10 (or 20) can not be identified, then the procedure is terminated and the digitized sampled and stored transaction signal is not used. When the source can be identified, but the transaction is not valid (e.g., as the result of a collision), then the procedure is terminated and digitized, sampled and stored signal is not used in step 407. In step 408, when the transaction is valid and the source node 10 (or 20) can be identified, then the source of the transaction and the associated sampled and digitized signal is stored in a memory in such a manner such that the source node 10 (or 20) identification and the stored transaction parameter are coupled. In response to a command from the remote management entity unit 21, the files of the source node identification signals and parameter signals associated with each transaction are transferred to the remote management entity unit 21 for processing in step 409.

Figure 5:
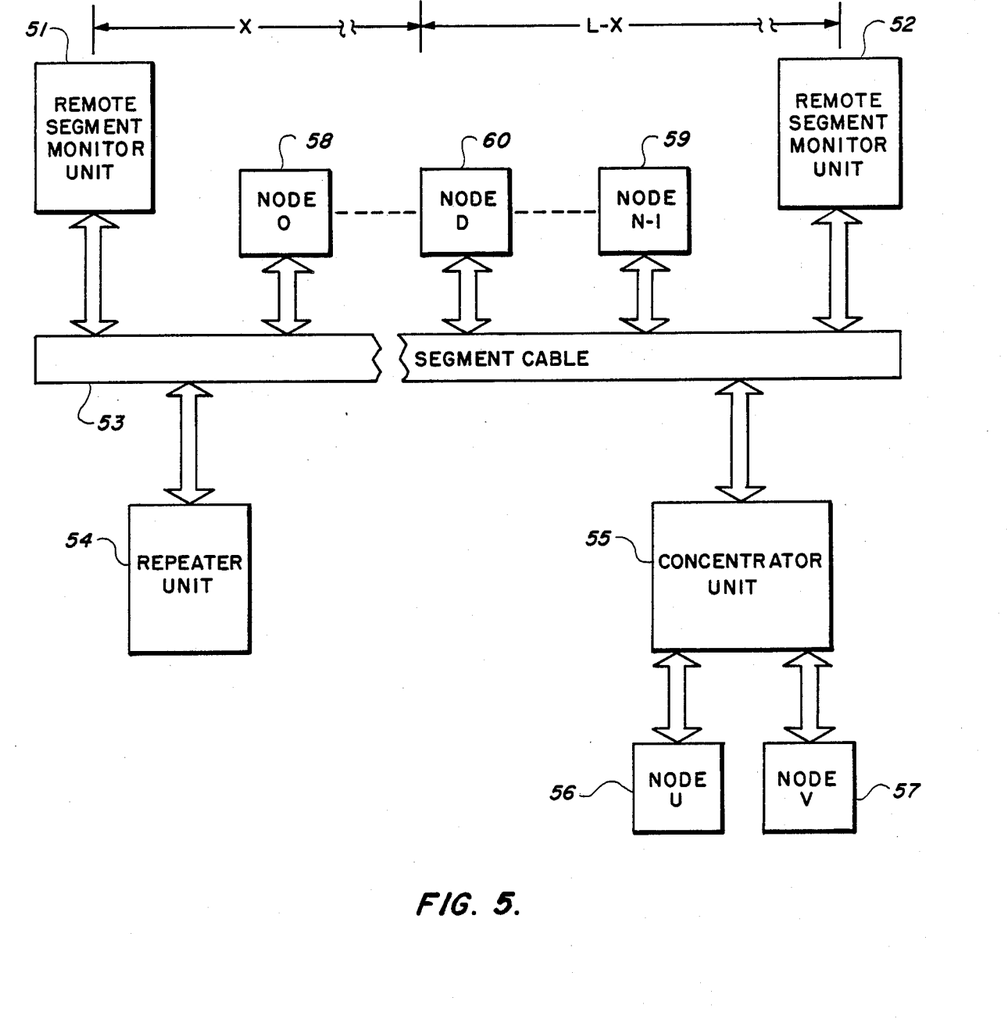
FIG. 5 is a block diagram of the network configuration used to calibrate the remote segment monitor unit.

Referring next to FIG. 5, the arrangement for providing a calibration of a remote segment monitor unit 25 is shown. The remote segment monitor unit 25 has the local network controller unit 34 coupled to the cable segment 11 in the normal mode of operation. However, the signal sampling circuit 31 is coupled directly to a signal generating unit 51. The signal generating unit 51 is controlled by a network node, in the preferred embodiment, the remote management entity unit 21 is used. The remote management entity unit 21 causes a plurality of known signal voltage levels to be applied to the signal sampling circuit 31 of the remote segment monitor unit by means of application of appropriate control signals to the signal generating unit 51.

2. Operation of the Preferred Embodiment

The operation of the remote segment monitor unit 25 can be understood in the following manner. When a transaction signal is placed on cable segment 11, the remote segment monitor unit 20 samples the magnitude of the transaction signal by means of signal sampling circuit 31. The sampled signal is applied to analog to digital converter unit 32 to obtain a digitized value proportional to the strength of the (sampled) transaction signal. This value is stored in a voltage register 33. Simultaneously, the local area network controller unit 34 decodes the transaction signal to the extent that the node from which the transaction originated, encoded in the preamble or header of the signal packet, can be identified. The preamble will also contain information, such as the identification of the destination node and the transaction message, which are ignored by the local network controller unit 34. In the preferred embodiment, the local network controller unit 34 is a specialized processor unit for decoding signals from the cable segment 11 and storing the decoded signals in the buffer register 35 and for taking signals in the buffer register, encoding the signals in a proper format and applying the signals with proper protocols to the cable segment 11. For the operation of the current invention, the local network controller unit 34 stores in the buffer register 35 only that portion of the decoded transaction that identifies the originating node of the transaction (and a transfer data instruction described below). When the source node has been identified, and the transaction is determined to be a valid one (e.g., no collision between transactions is detected), then the source identification is transferred to the microprocessor unit 36. The microprocessor unit 36 stores the value in the voltage register 33 in the RAM unit 37 in such a manner that the voltage register value is associated with the transaction source node 10 (or 20) identification.

The remote management entity unit 21 periodically transfers to the microprocessor unit 36 a transfer data instruction. This instruction causes the microprocessor 36 to retrieve the stored signal values from the RAM unit 37 and transfer this data, via the buffer register 35 and the local network controller unit 34 to the remote management entity unit 21 for analysis.

Referring again to FIG. 5, the calibration technique for the remote segment monitor unit 25 can be described. The signal generating unit 51 applies a plurality of known signal levels to the signal sampling circuit 31 of the remote segment monitor unit 25. Because the local network controller unit 34 is still coupled to the cable segment 11, the results of the application of known signal levels to the signal sampling circuit 31, stored in the remote segment monitor unit 25, can be transferred to the remote management entity unit 21 or other network node. The remote management entity unit 21, with information concerning the known signal applied to the remote segment monitor unit 25 and the signal stored in the remote segment monitor unit as a result of the application of known signal levels, can determine an off-set factor and a scaling factor (in the preferred embodiment) so that the signal measured by the signal sampling circuit 31 can be corrected. The measured voltage and the known applied voltage level are thus related by the following equation:

$$V_{KNOWN} = A + B * V_{MEASURED},$$

where
 A is the off-set factor, and
 B is the scaling factor.
(It will be clear that the relationship between the measured voltage level and the known voltage level can be approximated by a higher order polynomial for greater accuracy.) In the preferred embodiment, the off-set factor A and the scaling factor B are determined by a least squares algorithm. The known signal levels can also be stored in tables associated with each network node 10 (or 20) coupled to the segment cable.

In the absence of a calibrated remote segment monitor unit 25, repeated transfers of data from the remote segment monitor unit 25 to the remote management entity unit 21 can be used to provide a history of the signal (voltage) levels for each node 10 and 20 (data processing system). The values for each signal can be compared over a period of time and analyzed. The analysis can detect degrading signals and wildly varying signals.

With the calibrated remote segment monitor unit 25, the actual signal level applied to the cable segment 11 by a network node can be determined. Thus, the remote segment monitor unit 25 can determine if the conditions for satisfactory functioning of network nodes (or system components) exist on the network at any period of time, rather than inferring a failure as a function of time. Similarly, with assumptions concerning the signal level provided by a network node, and a value associated with the cable segment attenuation, the location of each network node can be inferred. Remote segment monitor units are typically coupled to the cable segment at cable segment ends to determine cable segment attenuation or, once the attenuation is determined, to identify a position of a network node providing signals to the cable segment with unknown strength. Once the remote segment monitor units 25 are calibrated, then a voltage level of a signal applied to the cable segment by a first remote segment monitor unit 25 can be measured by the first remote segment monitor unit 25 and by the second remote segment monitor unit 25, the actual signals levels determined by the two remote segment monitors permitting determination of the cable segment attenuation. It will be clear that the remote segment monitor unit 25 can measure its own signal level, the signal sampling circuit 31 and the local network controller unit 34 being separately coupled to the cable segment. It will be clear that when the network node applies a known voltage level to the cable segment and the cable segment attenuation is known, then the location of a network node can be determined by a single remote segment monitor unit 25.

By analyzing the data detected by the remote segment monitor unit 25 in the remote management entity unit 21, the functionality of the remote segment monitor unit 25 can be kept to a minimum. The limited functionality is important because a plurality of remote segment monitor units 25 may be used to monitor a multi-segment local area network. A single remote management entity unit 21 can be used in conjunction with the plurality of remote segment monitor units 25.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for measuring transaction signal magnitudes on a cable segment of a local area network, said apparatus comprising:
   a remote segment monitor unit coupled to said cable segment, said remote segment monitor unit including;
      signal determining means coupled to said cable segment for determining a quantity related to a signal magnitude of a network transaction on said cable segment,
      signal identification means coupled to said cable segment for providing an identification of a source of said network transaction, and
      storage means coupled to said signal determining means and to said signal identification means for storing a quantity related to a signal magnitude and for storing an identification of a signal source for each network transaction, wherein said storage means is coupled to said cable segment;
   management means coupled to said local area network for executing procedures, said management means applying a first instruction to said segment, said first instruction causing said remote segment monitor unit to transfer stored quantities and identifications stored in said storage means to said management means; and
   a signal generating unit coupled to said signal determining means for applying a plurality of known signal magnitudes to said signal determining means in response to control signals from said management means, said storage means storing known quantities related to said known signal magnitudes in response thereto, said management means including a comparison procedure for relating stored known quantities determined from said known signal magnitudes with said known signal magnitudes.

2. The measuring apparatus of claim 1 wherein said comparison procedure provides a off-set constant and a scaling factor relating said known signal magnitudes and said related known quantities.

3. The measuring apparatus of claim 2 wherein said remote segment monitor further includes a local network controller for exchanging signals with said cable segment, said signal determining means and said local network controller being separately coupled to said cable segment.

4. The measuring apparatus of claim 1 wherein results of said comparison procedure are used to determine an actual magnitude of said network transaction detected by said signal determining means.

5. A method for measuring actual magnitudes of transaction signals transmitted over a cable segment of a local area network by a remote segment monitor unit coupled to said cable segment, said remote segment monitor including a signal sampling circuit coupled to said cable segment for determining a magnitude indicia for each transaction signal and a storage unit for storing said magnitude indicia, said remote segment monitor including a signal sampling circuit for determining a magnitude indicia for each transaction signal and a storage unit storing said magnitude indicia received from said signal sampling circuit of said remote segment monitor unit, said remote segment monitor unit including identification apparatus coupled to said cable segment for providing an identification indicia identifying a source of said transaction signal and for storing said identification indicia in said storage unit, wherein said magnitude indicia and said identification indicia are transferred to a management unit coupled to said local area network for processing, said method comprising the steps of:

uncoupling said signal sampling circuit from said cable segment;

coupling said signal sampling circuit to a signal generating unit;

applying known signal magnitudes from said signal generating circuit to said signal sampling circuit in response to control signals from said management unit, said signal sampling circuit determining known magnitude indicia from said known signal magnitudes, said known magnitude indicia being stored in said remote segment monitor;

transferring said known magnitude indicia to said management unit;

comparing known magnitude indicia resulting from said applying known signals with said known signal magnitudes in said management unit to determine a relationship therebetween; and using said relationship to determine an actual magnitude indicia for each transaction signal from stored magnitude indicia resulting from said each transaction signal.

6. The method for measuring transaction signals of claim 5 further comprising the step of determining an attenuation factor for said segment cable, said attenuation factor and said relationship permitting said management unit to determine a magnitude of a signal applied to said segment cable by a transaction signal source having a known position on said cable segment relative to said remote segment monitor unit.

7. Apparatus for measuring transaction signal actual magnitudes on a cable segment of a local area network, said apparatus comprising:

a remote segment monitor unit coupled to said cable segment for determining and storing magnitude indicia of a transaction signal magnitude for each transaction signal transmitted on said cable segment, said remote segment monitor unit determining and storing identifying indicia associated with said each stored magnitude indicia, said identifying indicia identifying a source of said each transaction signal resulting in said stored magnitude indicia;

a management unit coupled to said local area network for causing said magnitude indicia and identifying indicia stored in said remote segment monitor unit to be transferred to said management unit, said management unit processing said transferred magnitude indicia and identifying indicia;

signal source means for applying a plurality of known signal magnitudes directly to said remote segment monitor unit in response to control signals from said management unit, wherein said remote segment monitor unit stores a known magnitude indicia for each said known signal magnitude, said management unit determining a relationship between said each known signal magnitude and said each known magnitude indicia resulting from application of said known signal magnitudes to said remote segment monitor unit; and wherein said relationship is used to determine an actual transaction signal magnitude for each transaction signal magnitude indicia.

8. The measuring apparatus of claim 7 further comprising means for determining a transaction signal attenuation factor for said cable segment.

9. The measuring apparatus of claim 8 wherein said management unit includes means for determining an actual transaction signal magnitude for said source providing transaction signals resulting in said stored magnitude indicia.

10. The measuring apparatus of claim 7 wherein said management unit transmits an instruction to said remote segment monitor unit, said remote segment monitor unit transferring stored magnitude indicia and stored identifying indicia to said management unit in response to said instruction.

11. The measuring apparatus of claim 7 wherein said management unit determines when a network node is failing from said transferred magnitude indicia related to transaction signals from said network node signal source and said relationship.

12. The measuring apparatus of claim 8 wherein said management unit determines a location of a network node signal source on said cable segment from said transaction signal magnitude indicia of said network node signal source, said relationship, and said cable segment attenuation factor.

13. Apparatus for determining signal generating parameters of network nodes coupled to a cable segment of a local area network, said apparatus comprising:

a first remote segment monitor coupled to said cable segment, said first remote segment monitor measuring and storing first magnitude indicia for transaction signal levels applied by said network nodes to said cable segment, each of said first magnitude indicia having identifying indicia associated therewith identifying a network node applying transaction signals to said cable segment;

a second remote segment monitor coupled to said segment cable a predetermined distance from said first remote segment monitor, said second remote segment monitor measuring and storing second magnitude indicia for transaction signal levels applied by said network nodes to said cable segment, each of said second magnitude indicia having second identifying indicia associated therewith identifying said network node applying said transaction signals to said cable segment; and a management unit coupled to said local area network for causing said stored indicia from said first and said second remote segment monitors to be transferred thereto;

signal generating means for applying known signal magnitudes directly to said first and to said second remote segment monitor units in response to control signals from said management unit, application of said known signal magnitudes causing said first and said second remote segment monitor units to store first and second known magnitude indicia therein;

wherein said management unit determines a first and second conversion means by comparing respectively said known signal magnitudes applied to said first remote segment monitor unit with first known magnitude indicia resulting therefrom and by comparing said known signal magnitudes applied to said second remote segment monitor unit with said second known magnitude indicia resulting therefrom, said first and said second conversion means for converting respectively said first and said second stored magnitude indicia to actual sign magnitudes received by said first and second remote segment monitor units; and wherein said management unit includes comparison means for comparing said first and said second actual magnitudes for transaction signals from each said remote segment units.

14. The apparatus for determining signal generating parameters of network nodes of claim 13 wherein said management unit further includes means for determining a transaction signal attenuation factor for said segment cable.

15. The apparatus for determining signal generating parameters of network nodes of claim 14 wherein said management unit comparison means includes computation means for determining a location of a network node applying transaction signals to said segment cable.

16. The apparatus for determining signal generating parameters of network nodes of claim 13 wherein said first and second conversion means each include values for an off-set constant and a scaling constant for converting signal magnitude indicia into actual signal magnitudes.

17. The apparatus for determining signal generating parameters of network nodes of claim 16 wherein said off-set constant and said scaling constant are determined by a least squares algorithm stored in said management unit.

18. The apparatus for determining signal generating parameters of network nodes of claim 13 wherein said first and said second remote segment monitors are coupled to said cable segment at end positions of said cable segment.

19. The measuring apparatus of claim 4 wherein said management unit further includes attenuation means for determining an attenuation factor of said transaction signals on said cable segment.

* * * * *